United States Patent
Kim

(10) Patent No.: US 11,469,835 B2
(45) Date of Patent: Oct. 11, 2022

(54) METHOD AND APPARATUS FOR REPORTING AN ID OF SPECIFIC BWP AMONG THE MULTIPLE BWPS IN WIRELESS COMMUNICATION SYSTEM

(71) Applicant: LG Electronics Inc., Seoul (KR)

(72) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 153 days.

(21) Appl. No.: 16/444,283

(22) Filed: Jun. 18, 2019

(65) Prior Publication Data

US 2019/0393969 A1    Dec. 26, 2019

(30) Foreign Application Priority Data

Jun. 22, 2018  (KR) .......................... 10-2018-0072396

(51) Int. Cl.
| | | |
|---|---|---|
| *H04B 17/318* | (2015.01) | |
| *H04W 24/10* | (2009.01) | |
| *H04L 5/00* | (2006.01) | |
| *H04W 76/27* | (2018.01) | |
| *H04W 76/11* | (2018.01) | |
| *H04W 80/02* | (2009.01) | |
| *H04W 72/08* | (2009.01) | |

(Continued)

(52) U.S. Cl.
CPC ......... *H04B 17/318* (2015.01); *H04L 5/0037* (2013.01); *H04W 24/10* (2013.01); *H04W 76/11* (2018.02); *H04W 76/27* (2018.02); *H04W 80/02* (2013.01);

(58) Field of Classification Search
CPC .... H04B 17/318; H04W 76/11; H04W 76/27; H04W 24/10; H04W 80/02; H04L 5/0037
See application file for complete search history.

(56) References Cited

U.S. PATENT DOCUMENTS

| | | | |
|---|---|---|---|
| 2018/0049047 A1* | 2/2018 | Lin ..................... | H04W 24/02 |
| 2018/0270699 A1* | 9/2018 | Babaei ............. | H04W 72/1284 |
| 2019/0089447 A1* | 3/2019 | Sang .................... | H04W 40/16 |

(Continued)

FOREIGN PATENT DOCUMENTS

WO    WO-2019099634 A1  *  5/2019    .......... H04W 52/365

OTHER PUBLICATIONS

3GPP TS 38.321, V15.2.0, Jun. 2018, Technical Specification Group Radio Access Network, Medium Access Control Protocol Specification, Release 15.

*Primary Examiner* — Kwang B Yao
*Assistant Examiner* — Xuan Lu
(74) *Attorney, Agent, or Firm* — Dentons US LLP

(57) ABSTRACT

A method and an apparatus for reporting an ID of specific BWP among the multiple BWPs in a wireless communication system is provided. The method, by a UE, may include configuring multiple bandwidth parts (BWPs) including at least one of an active bandwidth part (BWP), receiving a received signal strength indicator (RSSI) measurement configuration and/or a channel occupancy measurement configuration from the network, performing a RSSI measurement and/or a channel occupancy measurement per each of the multiple BWPs, and reporting an identifier (ID) of a specific BWP among the multiple BWPs to the network when a condition related to the RSSI measurement and/or the channel occupancy measurement of the active BWP and the specific BWP is met.

9 Claims, 15 Drawing Sheets

(51) Int. Cl.
*H04W 72/04* (2009.01)
*H04W 76/15* (2018.01)

(56) References Cited

U.S. PATENT DOCUMENTS

| | | | |
|---|---|---|---|
| 2019/0239112 A1* | 8/2019 | Rao | H04W 72/0406 |
| 2019/0261412 A1* | 8/2019 | Novlan | H04W 16/14 |
| 2019/0393989 A1* | 12/2019 | Jung | H04W 28/04 |
| 2020/0059345 A1* | 2/2020 | Pelletier | H04L 1/1657 |
| 2020/0213066 A1* | 7/2020 | Ma | H04L 41/0896 |

* cited by examiner

FIG. 8
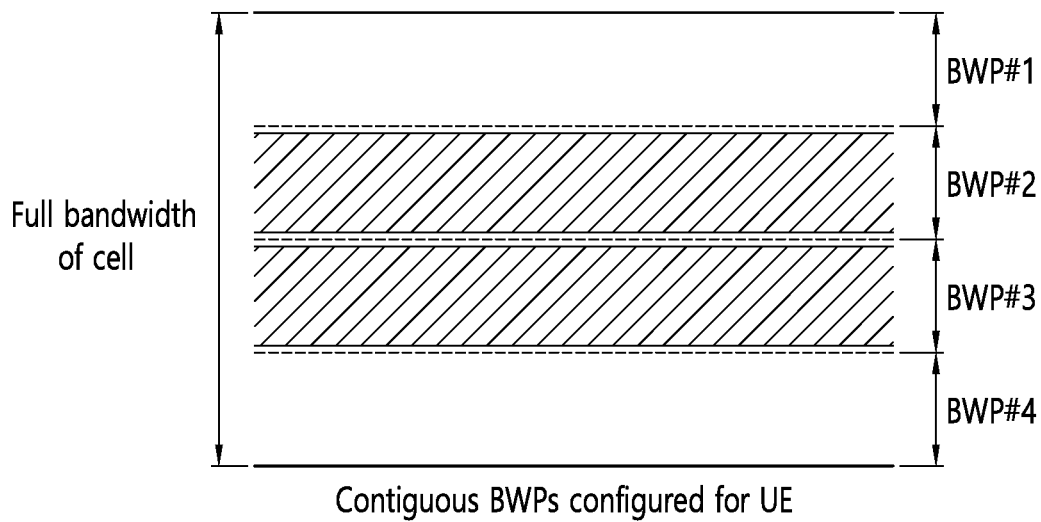
Contiguous BWPs configured for UE
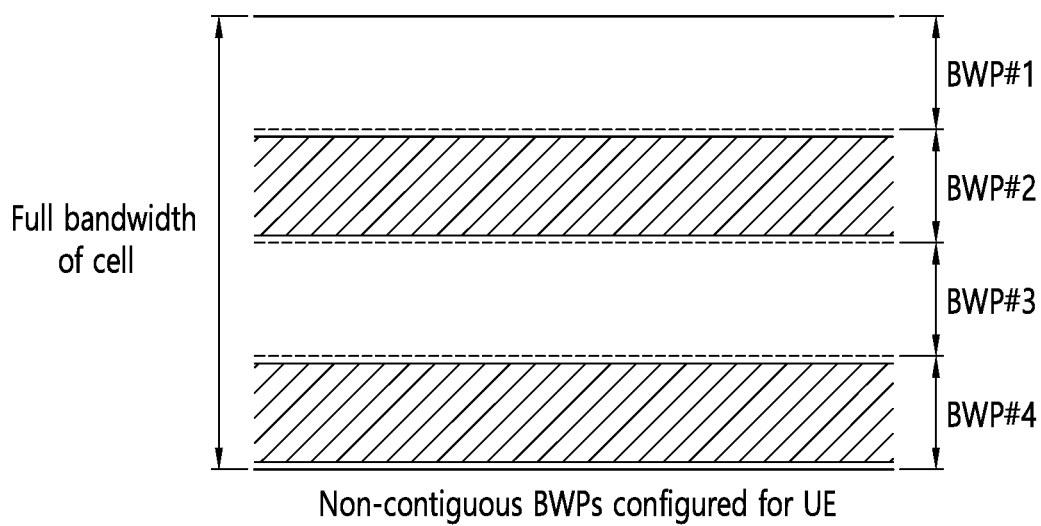
Non-contiguous BWPs configured for UE

METHOD AND APPARATUS FOR REPORTING AN ID OF SPECIFIC BWP AMONG THE MULTIPLE BWPS IN WIRELESS COMMUNICATION SYSTEM

CROSS-REFERENCE TO RELATED APPLICATIONS

Pursuant to 35 U.S.C. § 119 (e), this application claims the benefit of Korean Patent Application No. 10-2018-0072396, filed on Jun. 22, 2018, the contents of which are all hereby incorporated by reference herein in their entirety.

BACKGROUND OF THE INVENTION

Field of the Invention

The present invention relates to wireless communications, and more particularly, to a method and apparatus for reporting an identifier (ID) of a specific BWP among multiple BWPs based on the measurement results per each of multiple BWPs.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

NR is a technology that operates on a very wideband compared with LTE. In order to support flexible broadband operation, NR has the following design principles different from LTE in terms of broadband support.

The ability of the network and the user equipment (UE) to support the bandwidth may be different.

The bandwidth capabilities of the downlink and uplink supported by the UE may be different.

The capabilities of the bandwidths supported by each UE may differ, so that UEs supporting different bandwidths may coexist within one network frequency band.

In order to reduce the power consumption of the UE, the UE may be configured with different bandwidth depending on the traffic load state of the UE, etc.

In order to satisfy the above-mentioned design principles, NR newly introduced a concept of bandwidth part (BWP) in addition to carrier aggregation (CA) of existing LTE.

SUMMARY OF THE INVENTION

Due to the nature of the newly introduced BWP in NR, different issues can arise in different scenarios. The present invention discusses issues to reporting measurement results for each BWPs.

In an aspect, a method performed by a user equipment (UE) in a wireless communication system is provided. The method includes configuring multiple bandwidth parts (BWPs) including at least one of an active bandwidth part (BWP), receiving a received signal strength indicator (RSSI) measurement configuration and/or a channel occupancy measurement configuration from the network, performing a RSSI measurement and/or a channel occupancy measurement per each of the multiple BWPs, and reporting an identifier (ID) of a specific BWP among the multiple BWPs to the network when a condition related to the RSSI measurement and/or the channel occupancy measurement of the active BWP and the specific BWP is met.

In another aspect, a UE in a wireless communication system is provided. The UE comprises a memory, a transceiver, and a processor, operably coupled to the memory and the transceiver, and configured to configure multiple BWPs including at least one of an active BWP, control the transceiver to receive a RSSI measurement configuration and/or a channel occupancy measurement configuration from the network, perform a RSSI measurement and/or a channel occupancy measurement per each of the multiple BWPs, and control the transceiver to report an ID of a specific BWP among the multiple BWPs to the network when a condition related to the RSSI measurement and/or the channel occupancy measurement of the active BWP and the specific BWP is met.

BRIEF DESCRIPTION OF THE DRAWINGS

FIG. 8 shows an example of contiguous BWPs and non-contiguous BWPs to which technical features of the present invention may be applied.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
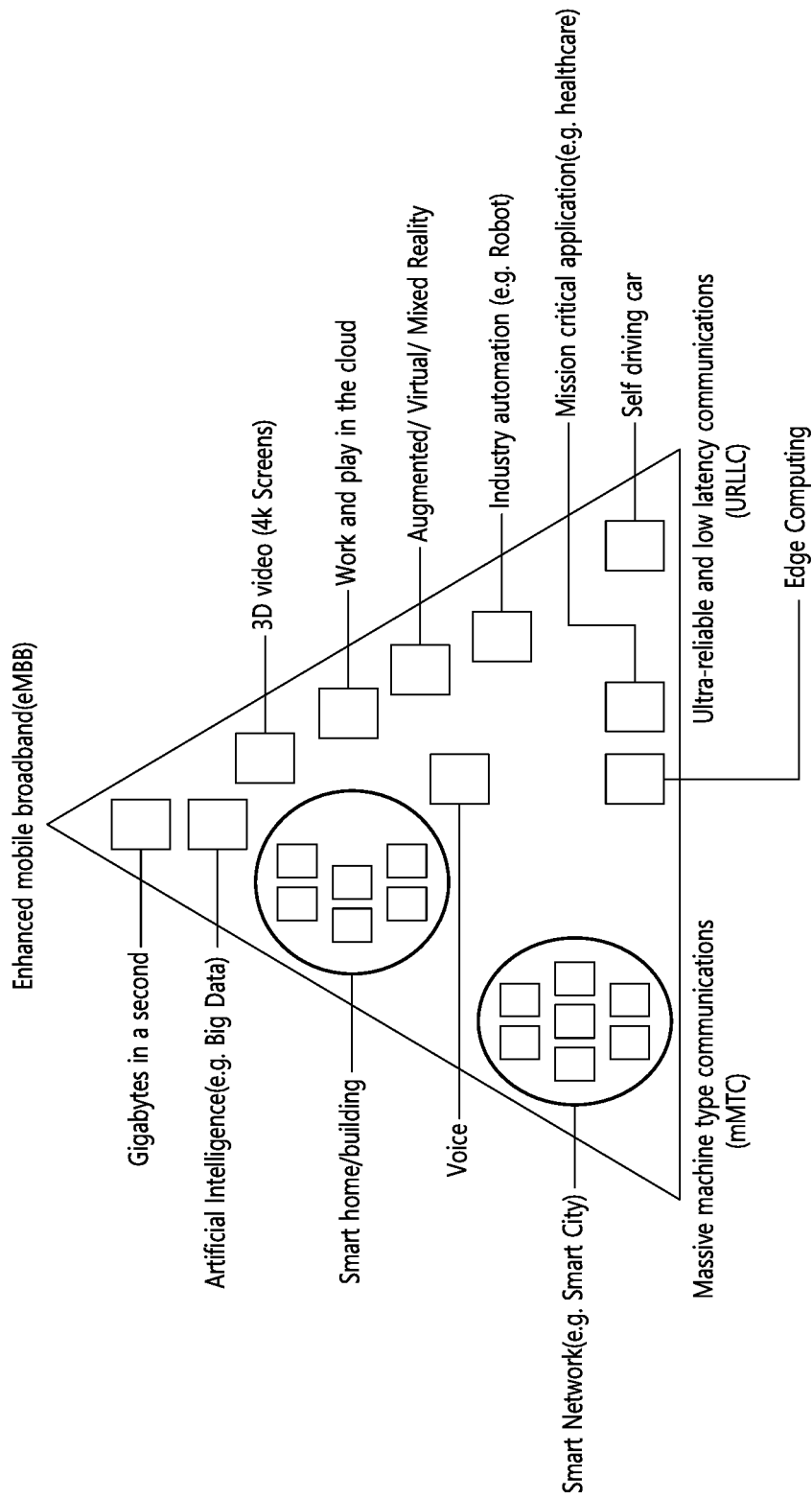
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
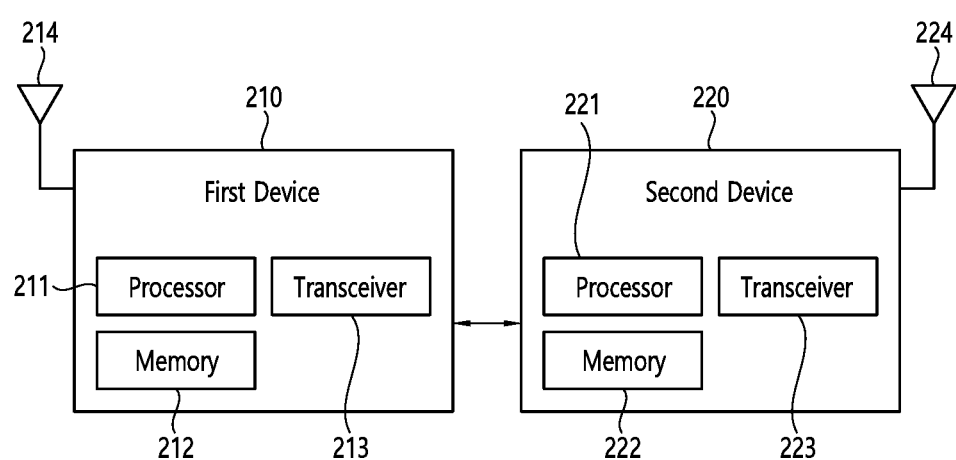
FIG. 2 shows an example of a wireless communication system to which the technical features of the present invention can be applied.

FIG. 2 shows an example of a wireless communication system to which the technical features of the present invention can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body.

For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
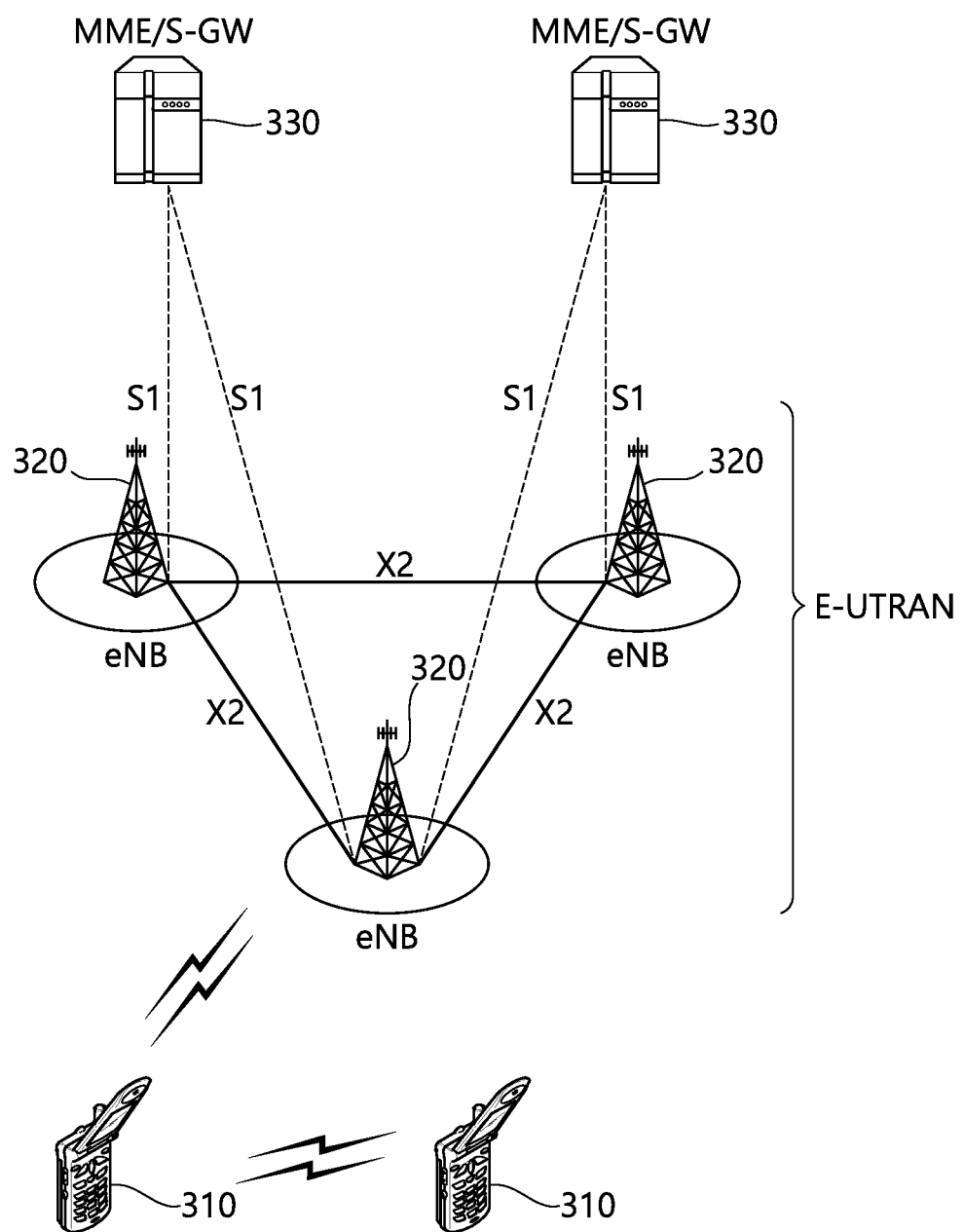
FIG. 3 shows another example of a wireless communication system to which the technical features of the present invention can be applied.

FIG. 3 shows another example of a wireless communication system to which the technical features of the present invention can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
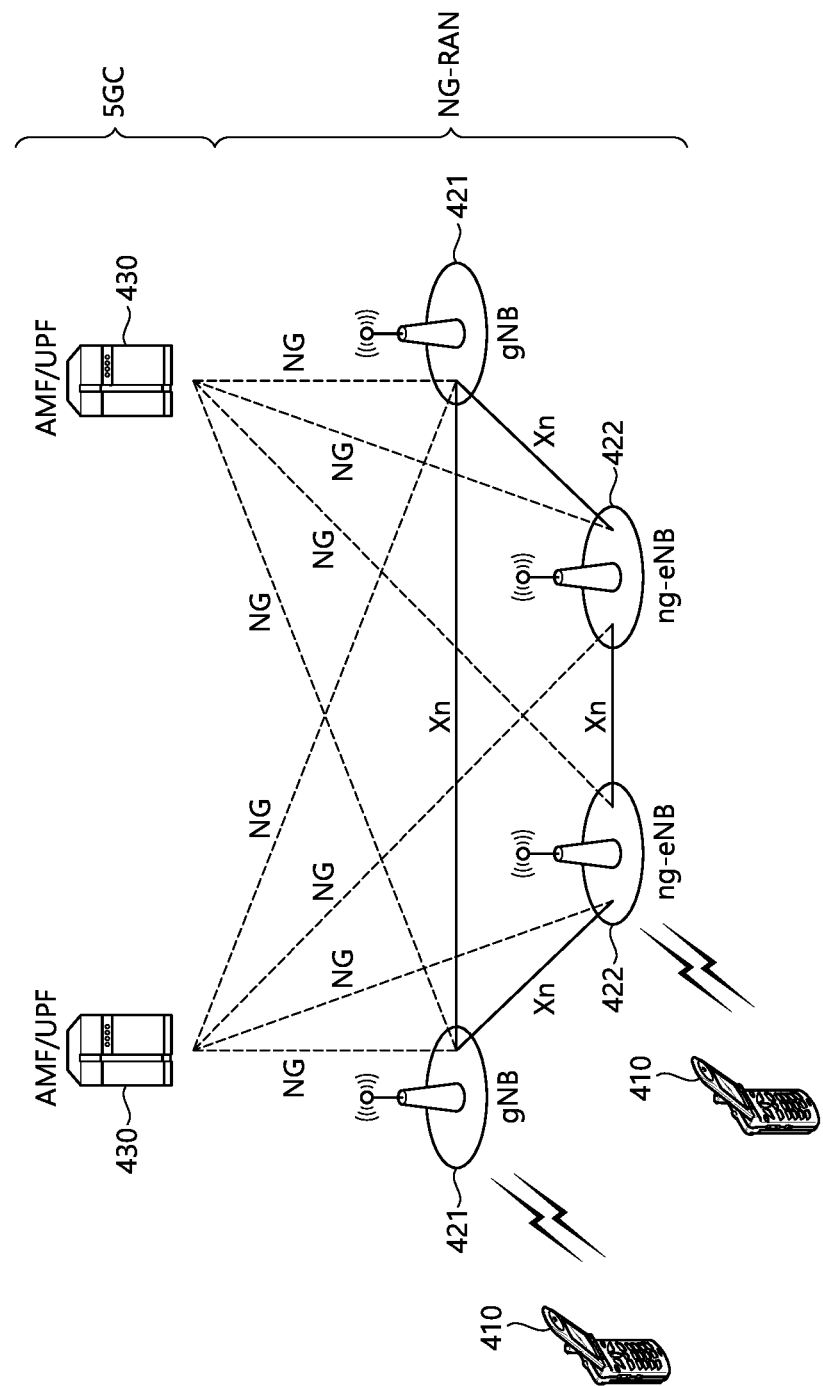
FIG. 4 shows another example of a wireless communication system to which the technical features of the present invention can be applied.

FIG. 4 shows another example of a wireless communication system to which the technical features of the present invention can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
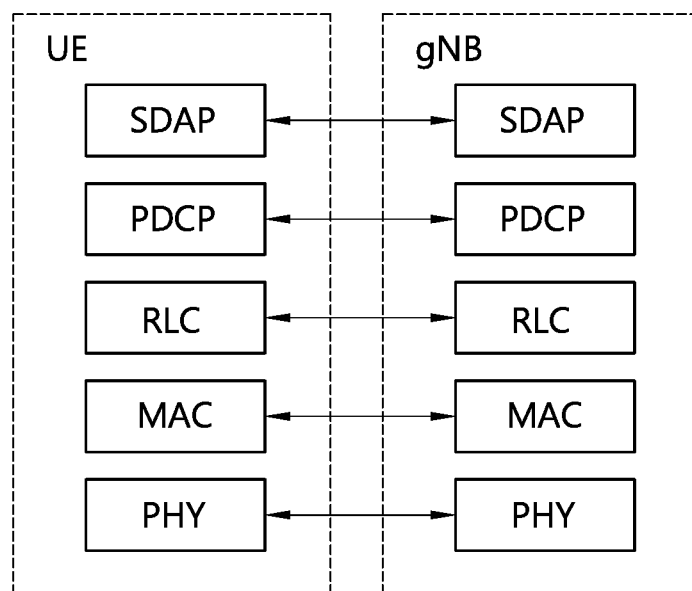
FIG. 5 shows a block diagram of a user plane protocol stack to which the technical features of the present invention can be applied.
Figure 6:
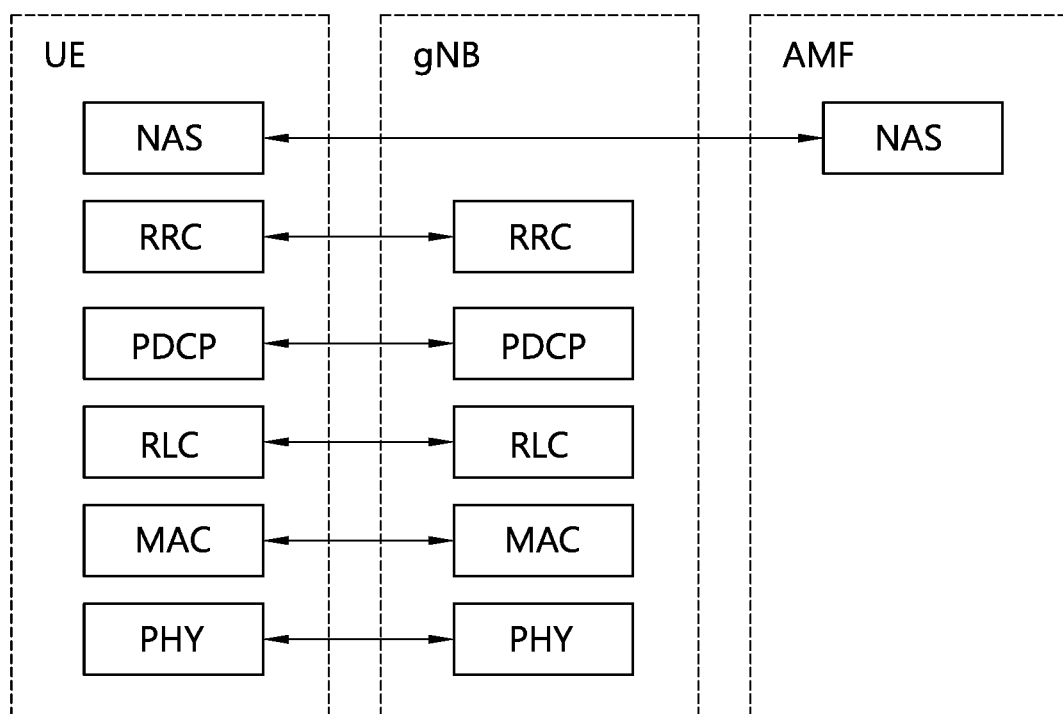
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, bandwidth part (BWP) is described.

Figure 7:
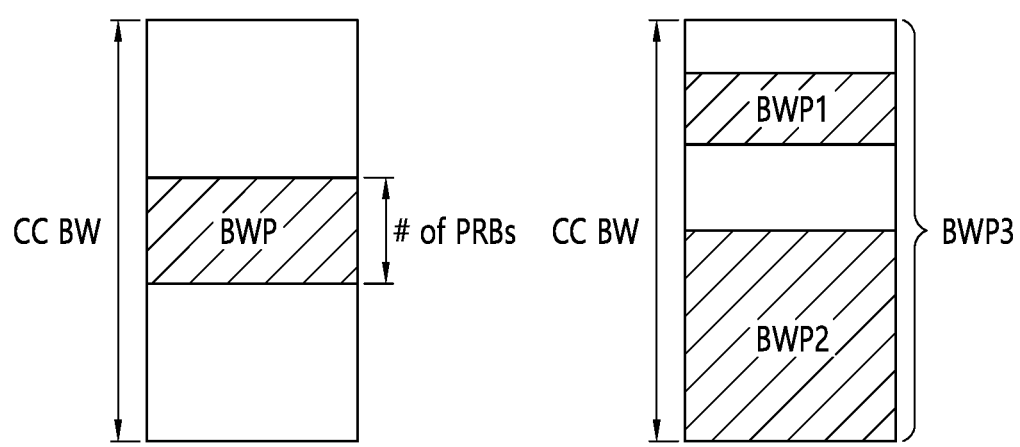
FIG. 7 shows an example of bandwidth part (BWP) configurations to which technical features of the present invention may be applied.

FIG. 7 shows an example of bandwidth part (BWP) configurations to which technical features of the present invention may be applied. Referring to FIG. 7, BWP consists of a group of contiguous physical resource blocks (PRBs). The bandwidth (BW) of BWP cannot exceed the configured component carrier (CC) BW for the UE. The BW of the BWP must be at least as large as one synchronization signal (SS) block BW, but the BWP may or may not contain SS block. Each BWP is associated with a specific numerology, i.e., sub-carrier spacing (SCS) and cyclic prefix (CP) type. Therefore, the BWP is also a means to reconfigure a UE with a certain numerology. As illustrated in the right figure of FIG. 7, the network can configure multiple BWPs to a UE via radio resource control (RRC) signaling, which may overlap in frequency. The granularity of BWP configuration is one PRB. For each serving cell, DL and UL BWPs are configured separately and independently for paired spectrum and up to four BWPs can be configured for DL and UL each. For unpaired spectrum, a DL BWP and a UL BWP are jointly configured as a pair and up to 4 pairs can be configured. There can be maximally 4 UL BWPs configured for a supplemental UL (SUL) as well.

FIG. 8 shows an example of contiguous BWPs and non-contiguous BWPs to which technical features of the present invention may be applied. Referring to FIG. 8, for serving cell measurements, a UE may be configured with multiple BWPs contiguously or non-contiguously. In order to derive quality of the serving cell, the UE measures only configured BWPs, not all BWPs that belongs to the serving cell.

Each configured DL BWP includes at least one control resource set (CORESET) with UE-specific search space (USS). The USS is a searching space for UE to monitor possible reception of control information destined for the UE. In the primary carrier, at least one of the configured DL BWPs includes one CORESET with common search space (CSS). The CSS is a searching space for UE to monitor possible reception of control information common for all UEs or destined for the particular UE. If the CORESET of an active DL BWP is not configured with CSS, the UE is not required to monitor it. Note that UEs are expected to receive and transmit only within the frequency range configured for the active BWPs with the associated numerologies. However, there are exceptions; a UE may perform Radio Resource Management (RRM) measurement or transmit sounding reference signal (SRS) outside of its active BWP via measurement gap.

Figure 9:
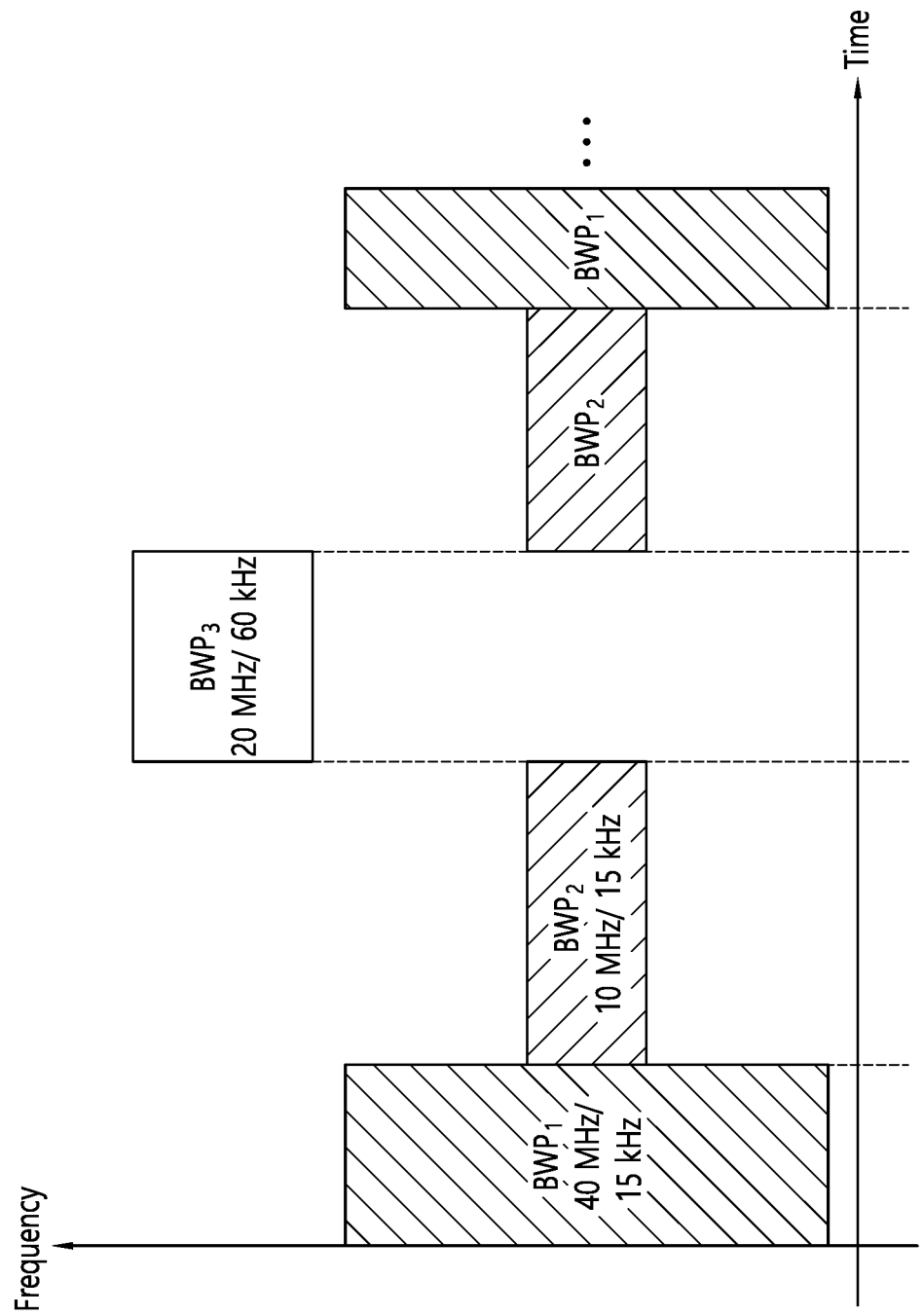
FIG. 9 shows an example of multiple BWPs to which technical features of the present invention can be applied.

FIG. 9 shows an example of multiple BWPs to which technical features of the present invention can be applied. Referring to FIG. 9, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

The BWP is also a tool to switch the operating numerology of a UE. The numerology of the DL BWP configuration is used at least for the Physical Downlink Control Channel (PDCCH), Physical Downlink Shared Channel (PDSCH) and corresponding demodulation RS (DMRS). Likewise, the numerology of the UL BWP configuration is used at least for the Physical Uplink Control Channel (PUCCH), Physical Uplink Shared Channel (PUSCH) and corresponding DMRS. On the other hand, it is noted that there is a restriction in the configuration of numerology at least in the early version of NR. That is, the same numerology shall be used within the same PUCCH group including both DL and UL.

Multiple options could be supported for BWP switching. Section 5.15 of 3GPP TS 38.321 V15.2.0 may be referred. The BWP switching for a Serving Cell may be used to activate an inactive BWP and deactivate an active BWP at a time. The BWP switching may be controlled by the PDCCH indicating a downlink assignment or an uplink grant, by the bwp-InactivityTimer, by RRC signaling, or by the MAC layer itself upon initiation of Random Access procedure. Upon addition of SpCell or activation of a SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL.

Upon initiation of the Random Access procedure on a Serving Cell, the MAC layer shall for this Serving Cell:
1> if PRACH occasions are not configured for the active UL BWP:
2> switch the active UL BWP to BWP indicated by initialUplinkBWP;
2> if the Serving Cell is a SpCell:
3> switch the active DL BWP to BWP indicated by initialDownlinkBWP.
1> else:
2> if the Serving Cell is a SpCell:
3> if the active DL BWP does not have the same bwp-Id as the active UL BWP:
4> switch the active DL BWP to the DL BWP with the same bwp-Id as the active UL BWP.
1> perform the Random Access procedure on the active DL BWP of SpCell and active UL BWP of this Serving Cell.

2> perform BWP switching to BWP indicated by the PDCCH.

Hereinafter, RSSI and/or channel occupancy measurements and measurement reporting are described.

The UE may report measurement information in accordance with the measurement configuration as provided by E-UTRAN. E-UTRAN may provide the measurement configuration applicable for a UE in RRC_CONNECTED by means of dedicated signaling, i.e. using the RRCConnectionReconfiguration or RRCConnectionResume message.

For RSSI and channel occupancy measurements, the UE measures and reports on any reception on the indicated frequency. For inter-RAT NR, the UE measures and reports on detected cells and, if configured with EN-DC, on NR serving cell(s). For inter-RAT UTRA, the UE measures and reports on listed cells and optionally on cells that are within a range for which reporting is allowed by E-UTRAN. For inter-RAT GERAN, the UE measures and reports on detected cells. For inter-RAT CDMA2000, the UE measures and reports on listed cells. For inter-RAT WLAN, the UE measures and reports on listed cells.

For all measurements, except for UE Rx-Tx time difference measurements, RSSI, UL PDCP Packet Delay per QCI measurement, channel occupancy measurements, CBR measurement, and except for WLAN measurements of Band, Carrier Info, Available Admission Capacity, Backhaul Bandwidth, Channel Utilization, and Station Count, the UE applies the layer 3 filtering, before using the measured results for evaluation of reporting criteria or for measurement reporting.

The purpose of the measurement reporting is to transfer measurement results from the UE to E-UTRAN. The UE shall initiate this procedure only after successful security activation.

For the measid for which the measurement reporting procedure was triggered, the UE shall set the measResults within the MeasurementReport message as follows:
1> if the measRSSI-ReportConfig is configured within the corresponding reportConfig for this measid:
2> set the rssi-Result to the average of sample value(s) provided by lower layers in the reportinterval;
2> set the channelOccupancy to the rounded percentage of sample values which are beyond to the channelOccupancyThreshold within all the sample values in the reportinterval;
1> submit the MeasurementReport message to lower layers for transmission, upon which the procedure ends.

Meanwhile, the channel busy rate can be different depending on BWP and the channel occupancy measurement for each BWP can be useful in selecting active BWP. However, network doesn't know the measurement result of each BWP. Therefore, the measurement results may need to be reported to the network for changing active BWP.

However, reporting all the results of RSSI and/or channel occupancy measurement may require a lot of resources. Therefore, a method of saving resources for reporting the measurement result is needed.

Furthermore, as described above, UE may receive RSSI and/or channel occupancy measurements configuration via RRC signaling. That is the RSSI and/or channel occupancy measurements may be performed by RRC layer of the UE. On the other hand, the BWP switching may be controlled by the PDCCH indicating a downlink assignment or an uplink grant, or by the MAC layer itself upon initiation of Random Access procedure. In this case, information of the changed active BWP may not be informed to the RRC layer. The RRC layer may not know that which BWP is the active BWP among the multiple BWPs. Therefore, the measurement result performed by RRC layer in UE may need to be provided to the lower layer, such as MAC layer.

However, providing all the results of RSSI and/or channel occupancy measurement to the MAC layer may require a lot of resources. Therefore, a method of saving resources for informing the measurement result is needed.

Hereinafter, a method for a UE to report an ID of a specific BWP among the multiple BWPs to the network, while saving resources, and an UE supporting the same according to an embodiment of the present invention are described in detail.

Figure 10:
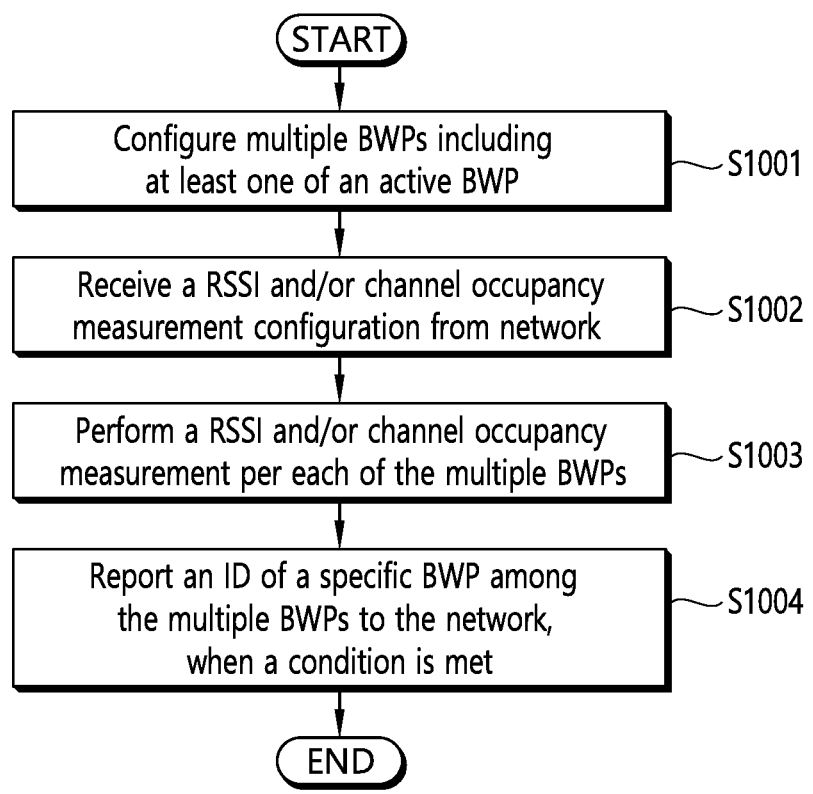
FIG. 10 shows a method for performing, by a UE, a RSSI measurement and/or a channel occupancy measurement and reporting an ID of a specific BWP among multiple BWPs and the corresponding measurement results to a network, according to some embodiments of the present disclosure.

FIG. 10 shows a method for performing, by a UE, a RSSI measurement and/or a channel occupancy measurement and reporting an ID of a specific BWP among multiple BWPs and the corresponding measurement results to a network, according to some embodiments of the present disclosure.

Referring to FIG. 10, in step S1001, the UE may configure multiple BWPs including at least one of active BWP. According to some embodiments of the present disclosure, the BWPs may be configured by the network. For example, the RRC layer in the UE may receive BWPs configuration from the network via RRC signaling. The BWP configuration may be configured in a serving cell of the network.

The RRC layer in the UE may configure the multiple BWPs. There is at least one of active BWP among the multiple BWPs. For example, multiple BWPs may include one active BWP and multiple inactive BWPs. The active BWP may be selected among the multiple BWPs. As described above, the selecting or switching an active BWP may be controlled by the PDCCH indicating, by RRC signaling, or by Random Access procedure of the MAC layer.

Referring to FIG. 10, in step S1002, the UE may receive RSSI and/or channel occupancy measurement configuration from the network. For example, RSSI measurement and/or channel occupancy measurement configuration are configured in measurement object configuration which is mapped to a serving cell in the network.

Referring to FIG. 10, in step S1003, the UE may perform RSSI and/or channel occupancy measurement per each of the multiple BWPs. According to some embodiments of the present disclosure, RRC layer in the UE may perform RSSI and/or channel occupancy measurement per each of the multiple BWPs, using information of the RSSI and/or channel occupancy measurement configuration from RRC layer in the network.

Referring to FIG. 10, in step S1004, the UE may report an ID of a specific BWP among the multiple BWPs to the network, when a condition related to the RSSI and/or channel occupancy measurement of the active BWP and the specific BWP is met. The UE may also report the results of the RSSI and/or channel occupancy measurement of the specific BWP when the condition is met.

According to some embodiments of the present disclosure, the condition may include a first condition and a second condition. When the first condition is met, the RRC layer in the UE provides an ID of at least one of a BWP among the multiple BWPs and/or the results of the RSSI measurement and/or the channel occupancy measurement to MAC layer in the UE. For example, when the first condition is met, RRC layer in the UE may provide an ID of a BWP having a lowest channel busy rate and/or the result of the RSSI and/or channel occupancy measurement to MAC layer in the UE. When the second condition is met, the MAC layer in the UE may report the ID of the specific BWP. When the second condition is met, the MAC layer in the UE may also report the results of the RSSI and/or channel occupancy measurement of the specific BWP.

The first condition may be related to a channel busy rate which is determined by results of the RSSI and/or channel occupancy measurement. For example, the first condition may be that a BWP having a lowest channel busy rate has been changed. For another example, the first condition may be that a BWP having a highest channel busy rate has been changed. For another example, the first condition may be that a channel busy rate of a BWP among the multiple BWPs becomes lower than a first threshold. For another example, the first condition may be that all of channel busy rates of the multiple BWPs become higher than a third threshold.

According to some embodiments of the present disclosure, the channel busy rate may be determined as a ratio of number of occupied channels in a BWP to total number of channels in the BWP during a certain time period. For example, a channel may be determined as an occupied channel, when the result of the RSSI measurement of the channel is higher than a threshold. The result of channel occupancy measurement of a BWP may be described as a ratio of a number of occupied channels in the BWP to the number of total channels in the BWP at a certain moment. The channel busy rate may be calculated as an average of the channel occupancy rates for a certain time duration. However, the present invention is not limited thereto. For example, the channel busy rate may be determined based on a size of a BWP (for example, total number of channels in BWP), frequency characteristics, and etc.

The second condition may be related to the ID of at least one of a BWP among the multiple BWPs and/or the results of the RSSI and/or channel occupancy measurement received from the RRC layer in the UE. According to some embodiments of the present disclosure, the second condition may be related to the ID of the BWP having a lowest channel busy rate and/or the results of the RSSI and/or channel occupancy measurement received from the RRC layer in the UE.

For example, the second condition may be that the results of the RSSI and/or channel occupancy measurement of an inactive BWP is lower than the results of the RSSI and/or channel occupancy measurement of the active BWP. In this case, the MAC layer in the UE may report an ID of the inactive BWP, as the ID of the specific BWP, to the network.

For another example, the second condition may be that the results of the RSSI and/or channel occupancy measurement of the active BWP is higher than a fourth threshold. In this case, the MAC layer in the UE may report the ID of the BWP having a lowest channel busy rate, as the ID of the specific BWP, to the network.

For another example, the second condition may be that the results of the RSSI and/or channel occupancy measurement of an inactive BWP is lower than a fifth threshold. In this case, the MAC layer in the UE may reports an ID of the inactive BWP, as the ID of the specific BWP, to the network.

Figure 11:
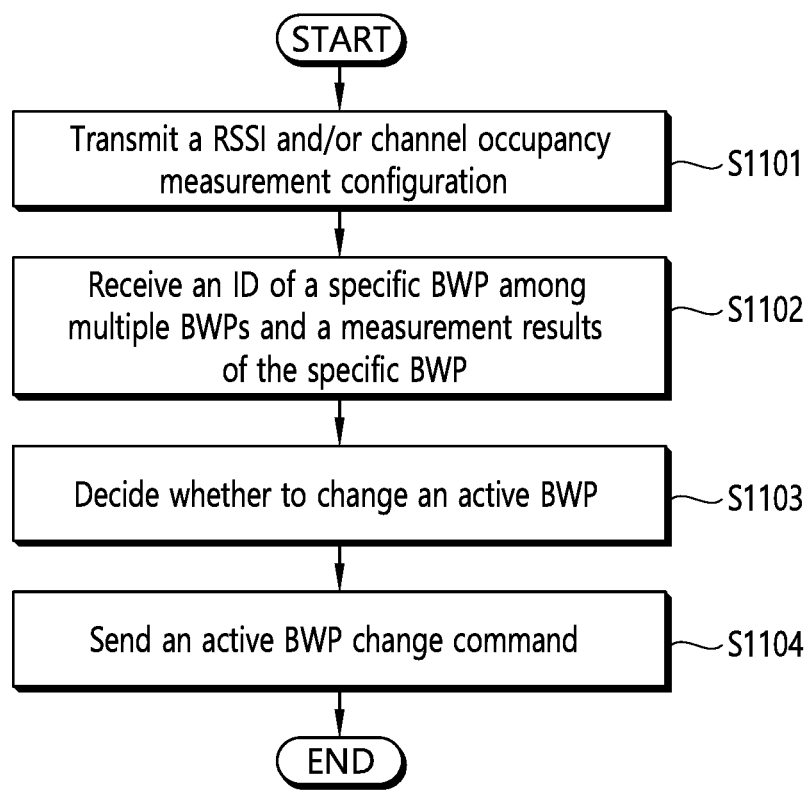
FIG. 11 shows a method for commanding, by a network, to change an active BWP among multiple BWPs in a UE, according to some embodiments of the present disclosure.

FIG. 11 shows a method for commanding, by a network, to change an active BWP among multiple BWPs in a UE, according to some embodiments of the present disclosure. The present disclosure described above for network side may be applied to this embodiment.

Referring to FIG. 11, in step S1101, the network may transmit RSSI and/or channel occupancy measurement configuration to the UE. For example, a serving cell in the network may transmit the measurement configuration to the UE. For another example, RRC layer in the serving cell may transmit the measurement configuration to RRC layer in the UE.

Referring to FIG. 11, in step S1102, the network may receive an ID of a specific BWP among multiple BWPs and measurement results of the specific BWP from the UE. For example, a serving cell in the network may receive the ID of the specific BWP and the measurement results from the UE. For another example, MAC layer in the serving cell may receive the ID of the specific BWP and the measurement results from MAC layer in the UE.

Referring to FIG. 11, in step S1103, the network may decide whether to change an active BWP based on the received ID of the specific BWP and the corresponding measurement results. For example, the network may decide to change the active BWP to the specific BWP based on the frequency characteristics, state of BWP, and etc. For another example, a serving cell in the network may decide whether to change the active BWP or not. For another example, MAC layer in the serving cell may decide whether to change the active BWP or not.

Referring to FIG. 11, in step S1104, the network may send a command for changing an active BWP to the UE. For example, a serving cell in the network may send the command to the UE. For another example, MAC layer in a serving node in the network may send the command to MAC layer in the UE.

Figure 12:
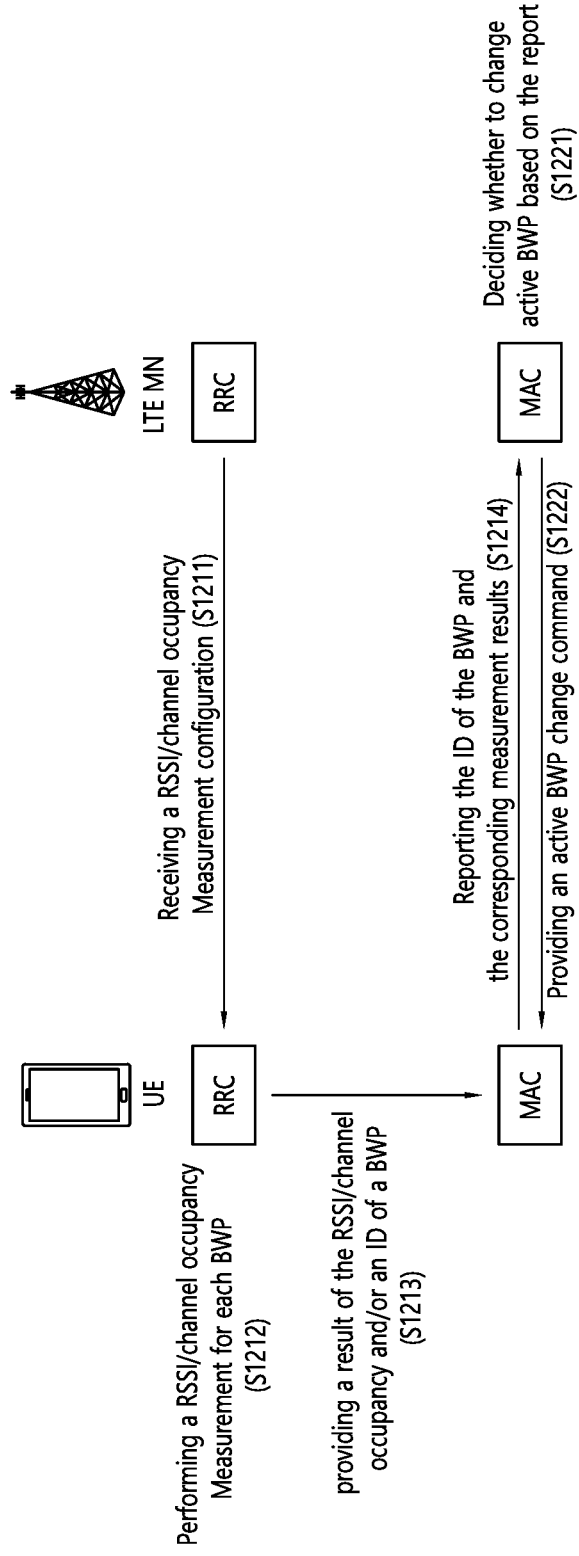
FIG. 12 shows an example of a method for reporting the measurement results to a network, according to the present invention.

FIG. 12 shows an example of a method for reporting the measurement results to a network, according to the present invention. More specifically, step S1211 to S1214 show a method for reporting, by a UE, an ID of a specific BWP and corresponding measurement results to a network, and step S1221 to S1222 show a method for providing, by the network, a command for changing an active BWP.

According to some embodiments of present disclosure, a serving cell (for example, PCell, PSCell, or SCell) may operate on an unlicensed frequency. For example, LTE-U or LAA may be used by the network.

According to some embodiments of present disclosure, multiple bandwidth parts (BWPs) may be configured by a UE. For example, BWP configuration including information of multiple BWPs may be provided from the network. The BWP configuration may be configured in serving cell configuration. The multiple BWPs may include at least one of active BWP and multiple inactive BWPs. The UE may configure the multiple BWPs including at least one of active BWP based on the BWP configuration from the network.

Regarding to FIG. 12, in step S1211, RSSI and/or channel occupancy measurement configuration may be received by the UE from a network. According to some embodiments of present disclosure, RSSI and/or channel occupancy measurement configuration may be received by RRC layer of the UE from RRC layer of a serving node in the network. For example, network may provide the measurement configuration for the UE using dedicated signaling such as RRC-ConnectionReconfiguration or RRCConnectionResume message.

Regarding to FIG. 12, in step S1212, the UE may perform RSSI and/or occupancy measurement for each of the multiple BWPs configured by the network. According to some embodiments of present disclosure, if the RSSI and/or channel occupancy measurement is configured for a measurement object mapped to a corresponding serving cell, RRC layer in UE may perform RSSI measurement and/or channel occupancy measurement for each DL BWP and UL BWP configured by network. For example, RSSI measurement and/or channel occupancy measurement configuration may be configured in measurement object configuration which is mapped to a serving cell.

Regarding to FIG. 12, in step S1213, when one of following conditions (condition 1-1 to condition 1-5) is met, RRC layer in UE indicates that the condition is met to MAC layer in UE. In this case, the RRC layer can also provide the measurement results to MAC layer if one of the following conditions is met. For example, the RRC layer in the UE provides an ID of at least one of a BWP among the multiple BWPs and/or the results of the RSSI measurement and/or the channel occupancy measurement to MAC layer in the UE. For another example, RRC layer in the UE may provide an ID of a BWP having the lowest channel busy rate and/or the measurement results to MAC layer in UE. The channel busy rate may be determined based on results of the RSSI measurement and/or the channel occupancy measurement.

Condition 1-1: The channel busy rate of one of BWP becomes lower than threshold1. (UE can get the channel busy rate by performing the RSSI and channel occupancy measurement.)

Condition 1-2: The channel busy rate of one of BWP becomes higher than threshold2.

Condition 1-3: The best BWP, i.e. the BWP which has the lowest channel busy rate, changes.

Condition 1-4: The worst BWP, i.e. the BWP which have the highest channel busy rate, changes.

Condition 1-5: The channel busy rate of all BWPs becomes higher than threshold3.

Desirably, if one of the conditions is met, RRC in UE can send RRC message, e.g. measurement report, to RRC in network instead of indicating to MAC layer. The RRC message can include RSSI/channel occupancy measurement results of each BWP.

Desirably, the reporting (reporting to MAC or network) condition can be configured by network.

Regarding to FIG. 12, in step S1214, MAC layer may decide whether to report an ID of a specific BWP and corresponding measurement results to MAC layer in network. MAC layer in UE may make the decision based the ID of at least one of BWP among multiple BWPs and/or the measurement results received from RRC layer. According to some embodiments of present disclosure, if one of the following conditions (condition 2-1 to condition 2-4) is met, MAC layer in the UE may report an ID of a specific BWP to MAC layer in the network. The measurement results of RSSI and/or channel occupancy of the specific BWP can be also reported to the MAC layer in the network.

Condition 2-1: If MAC layer receives an ID of a BWP and/or the results of RSSI and/or channel occupancy measurement from RRC layer.

Condition 2-2: The results of RSSI and/or channel occupancy measurement of one of neighborhood (inactive) BWP becomes lower than the results of RSSI and/or channel occupancy measurement of active BWP. (For example, one of neighborhood BWP becomes better than active BWP.) When this condition is met, MAC layer in the UE may inform the identity of the neighborhood BWP to MAC layer in network.

Condition 2-3: The measurement results of RSSI or channel occupancy of active BWP becomes higher than fourth threshold4. (I.e. Active BWP becomes worse than a threshold.)

Condition 2-4: The measurement results of RSSI or channel occupancy of one of neighborhood (inactive) BWP becomes lower than threshold5. (I.e. one of neighborhood BWP becomes better than a threshold.) When this condition is met, MAC layer in UE may inform MAC layer in network of identity of the neighborhood BWP.

Regarding to FIG. 12, in step S1221, the network may determine whether to change active BWP, based on the reported BWP identity and/or measurement results. For example, if UE indicates that a certain inactive BWP is easier than active BWP in terms of channel busy rate, the network will determine to change active BWP to the indicated BWP.

Regarding to FIG. 12, in step S1222, Network may command the UE to change the active BWP via MAC control element (CE).

According to some embodiments of the present disclosure shown in FIGS. 10 to 12, a UE may report an ID of a specific BWP and/or the corresponding measurement results to the network while saving resources, since the UE may report the ID of the specific BWP and/or the corresponding measurement results when a condition related to the measurement result of the specific BWP and an active BWP is met. Furthermore, the network mas use the received ID of the specific BWP and/or the corresponding measurement results for deciding whether to change an active BWP or not.

In addition, according to some embodiments of the present disclosure shown in FIGS. 10 to 12, a UE may save resources for determining whether to report an ID of a specific BWP and/or the corresponding measurement results to the network, since a RRC layer of the UE may provide an ID of at least one of a BWP among multiple BWPs and/or the measurement results when a first condition related to a channel busy rates of BWP to a MAC layer of the UE.

Figure 13:
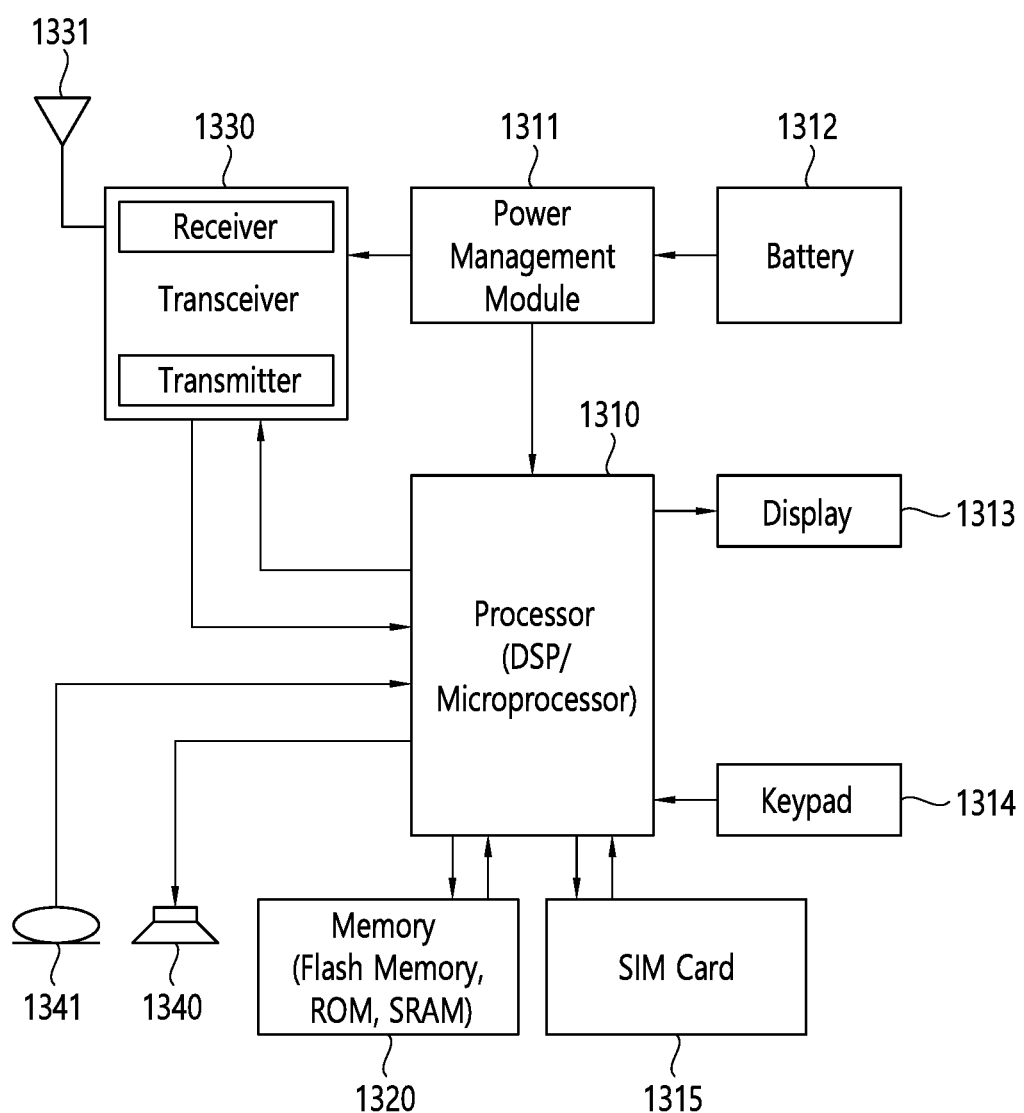
FIG. 13 shows a UE to implement an embodiment of the present invention.

FIG. 13 shows a UE to implement an embodiment of the present invention. The present invention described above for UE side may be applied to this embodiment.

A UE includes a processor 1310, a power management module 1311, a battery 1312, a display 1313, a keypad 1314, a subscriber identification module (SIM) card 1315, a memory 1320, a transceiver 1330, one or more antennas 1331, a speaker 1340, and a microphone 1341.

The processor 1310 may be configured to implement proposed functions, procedures and/or methods described in this description. Layers of the radio interface protocol may be implemented in the processor 1310. The processor 1310 may include application-specific integrated circuit (ASIC), other chipset, logic circuit and/or data processing device. The processor 1310 may be an application processor (AP). The processor 1310 may include at least one of a digital signal processor (DSP), a central processing unit (CPU), a graphics processing unit (GPU), a modem (modulator and demodulator). An example of the processor 1310 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

According to some embodiments of the present disclosure, the processor 1310 may be configured to be coupled operably with the memory 1320 and the transceiver 1330. The processor 1310 may be configured to configure multiple BWPs including at least one of active BWP. The processor 1310 may be configured to control the transceiver 1330 to receive RSSI and/or channel occupancy measurement configuration from the network. The processor 1310 may be configured to perform RSSI and/or channel occupancy measurement per each of the multiple BWPs. The processor 1310 may be configured to control the transceiver 1330 to report an ID of a specific BWP among the multiple BWPs to the network when a condition related to the RSSI and/or channel occupancy measurement of the active BWP and the specific BWP is met.

The power management module 1311 manages power for the processor 1310 and/or the transceiver 1330. The battery 1312 supplies power to the power management module 1311. The display 1313 outputs results processed by the processor 1310. The keypad 1314 receives inputs to be used by the processor 1310. The keypad 1314 may be shown on the display 1313. The SIM card 1315 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1320 is operatively coupled with the processor 1310 and stores a variety of information to operate the processor 1310. The memory 1320 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1320 and executed by the processor 1310. The memory 1320 can be implemented within the processor 1310 or external to the processor 1310 in which case those can be communicatively coupled to the processor 1310 via various means as is known in the art.

The transceiver 1330 is operatively coupled with the processor 1310, and transmits and/or receives a radio signal. The transceiver 1330 includes a transmitter and a receiver. The transceiver 1330 may include baseband circuitry to process radio frequency signals. The transceiver 1330 controls the one or more antennas 1331 to transmit and/or receive a radio signal.

The speaker 1340 outputs sound-related results processed by the processor 1310. The microphone 1341 receives sound-related inputs to be used by the processor 1310.

According to an embodiment of the present invention shown in FIG. 13, the processor 1310 of a UE may configure multiple BWPs including at least one of active BWP. The transceiver 1330 of the UE may receive RSSI and/or channel occupancy measurement configuration from the network. The processor 1310 of the UE may performs RSSI and/or channel occupancy measurement per each of the multiple BWPs. The transceiver 1330 of the UE may reports an ID of a specific BWP among the multiple BWPs to the network when a condition related to the RSSI and/or channel occupancy measurement of the active BWP and the specific BWP is met.

According to some embodiments of the present disclosure shown in FIG. 13, a transceiver 1330 of a UE may report an ID of a specific BWP and/or the corresponding measurement results to the network while saving resources, since the transceiver 1330 of the UE may report the ID of the specific BWP and/or the corresponding measurement results when a condition related to the measurement result of the specific BWP and an active BWP is met. Furthermore, the network mas use the received ID of the specific BWP and/or the corresponding measurement results for deciding whether to change an active BWP or not.

In addition, according to some embodiments of the present disclosure shown in FIG. 13, a processor 1310 of a UE may save resources for determining whether to report an ID of a specific BWP and/or the corresponding measurement results to the network, since a RRC layer of the processor 1310 of the UE may provide an ID of at least one of a BWP among multiple BWPs and/or the measurement results when a first condition related to a channel busy rates of BWP to a MAC layer of the processor 1310 of the UE.

The present invention may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 14:
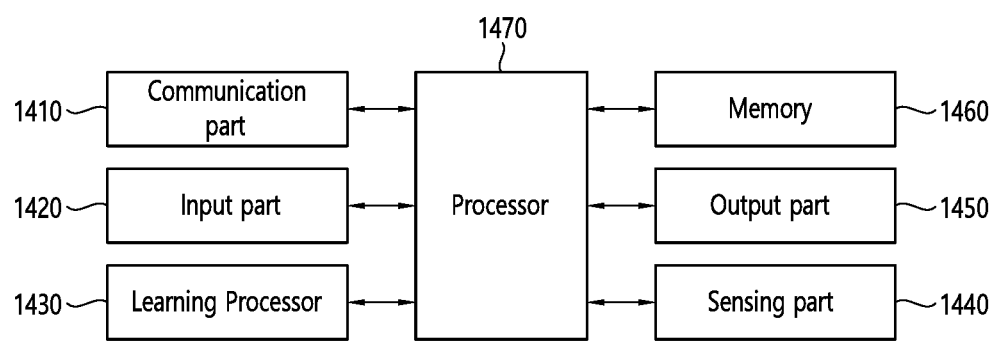
FIG. 14 shows an example of an AI device to which the technical features of the present invention can be applied.

FIG. 14 shows an example of an AI device to which the technical features of the present invention can be applied.

The AI device 1400 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 14, the AI device 1400 may include a communication part 1410, an input part 1420, a learning processor 1430, a sensing part 1440, an output part 1450, a memory 1460, and a processor 1470.

The communication part 1410 can transmit and/or receive data to and/or from external devices such as the AI devices and the AI server using wire and/or wireless communication technology. For example, the communication part 1410 can transmit and/or receive sensor information, a user input, a learning model, and a control signal with external devices. The communication technology used by the communication part 1410 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1420 can acquire various kinds of data. The input part 1420 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1420 can acquire input data to be used when acquiring an output using learning data and a learning model for model learning. The input part 1420 may obtain raw input data, in which case the processor 1470 or the learning processor 1430 may extract input features by preprocessing the input data.

The learning processor 1430 may learn a model composed of an ANN using learning data. The learned ANN can be referred to as a learning model. The learning model can be used to infer result values for new input data rather than learning data, and the inferred values can be used as a basis for determining which actions to perform. The learning processor 1430 may perform AI processing together with the learning processor of the AI server. The learning processor 1430 may include a memory integrated and/or implemented in the AI device 1400. Alternatively, the learning processor 1430 may be implemented using the memory 1460, an external memory directly coupled to the AI device 1400, and/or a memory maintained in an external device.

The sensing part 1440 may acquire at least one of internal information of the AI device 1400, environment information of the AI device 1400, and/or the user information using various sensors. The sensors included in the sensing part 1440 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1450 may generate an output related to visual, auditory, tactile, etc. The output part 1450 may include a display unit for outputting visual information, a speaker for outputting auditory information, and/or a haptic module for outputting tactile information.

The memory 1460 may store data that supports various functions of the AI device 1400. For example, the memory 1460 may store input data acquired by the input part 1420, learning data, a learning model, a learning history, etc.

The processor 1470 may determine at least one executable operation of the AI device 1100 based on information determined and/or generated using a data analysis algorithm and/or a machine learning algorithm. The processor 1470 may then control the components of the AI device 1100 to perform the determined operation. The processor 1470 may request, retrieve, receive, and/or utilize data in the learning processor 1430 and/or the memory 1460, and may control the components of the AI device 1400 to execute the predicted operation and/or the operation determined to be desirable among the at least one executable operation. The processor 1470 may generate a control signal for controlling the external device, and may transmit the generated control signal to the external device, when the external device needs to be linked to perform the determined operation. The processor 1470 may obtain the intention information for the user input and determine the user's requirements based on the obtained intention information. The processor 1470 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1430 and/or learned by the learning processor of the AI server, and/or learned by their distributed processing. The processor 1470 may collect history information including the operation contents of the AI device 1400 and/or the user's feedback on the operation, etc. The processor 1470 may store the collected history information in the memory 1460 and/or the learning processor 1430, and/or transmit to an external device such as the AI server. The collected history information can be used to update the learning model. The processor 1470 may control at least some of the components of AI device 1400 to drive an application program stored in memory 1460. Furthermore, the processor 1470 may operate two or more of the components included in the AI device 1100 in combination with each other for driving the application program.

Figure 15:
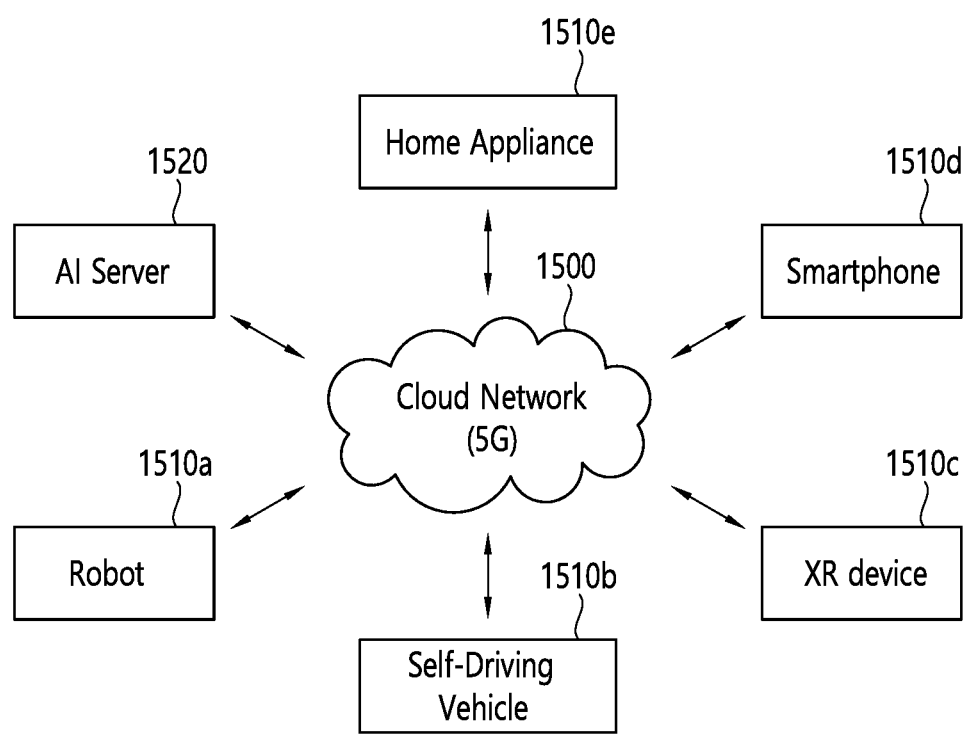
FIG. 15 shows an example of an AI system to which the technical features of the present invention can be applied.

FIG. 15 shows an example of an AI system to which the technical features of the present invention can be applied.

Referring to FIG. 15, in the AI system, at least one of an AI server 1520, a robot 1510*a*, an autonomous vehicle 1510*b*, an XR device 1510*c*, a smartphone 1510*d* and/or a home appliance 1510*e* is connected to a cloud network 1500. The robot 1510*a*, the autonomous vehicle 1510*b*, the XR device 1510*c*, the smartphone 1510*d*, and/or the home appliance 1510*e* to which the AI technology is applied may be referred to as AI devices 1510*a* to 1510*e*.

The cloud network 1500 may refer to a network that forms part of a cloud computing infrastructure and/or resides in a cloud computing infrastructure. The cloud network 1500 may be configured using a 3G network, a 4G or LTE network, and/or a 5G network. That is, each of the devices 1510*a* to 1510*e* and 1520 consisting the AI system may be connected to each other through the cloud network 1500. In particular, each of the devices 1510*a* to 1510*e* and 1520 may communicate with each other through a base station, but may directly communicate with each other without using a base station.

The AI server 1520 may include a server for performing AI processing and a server for performing operations on big data. The AI server 1520 is connected to at least one or more of AI devices constituting the AI system, i.e. the robot 1510*a*, the autonomous vehicle 1510*b*, the XR device 1510*c*, the smartphone 1510*d* and/or the home appliance 1510*e* through the cloud network 1500, and may assist at least some AI processing of the connected AI devices 1510*a* to 1510*e*. The AI server 1520 can learn the ANN according to the machine learning algorithm on behalf of the AI devices 1510*a* to 1510*e*, and can directly store the learning models and/or transmit them to the AI devices 1510*a* to 1510*e*. The AI server 1520 may receive the input data from the AI devices 1510*a* to 1510*e*, infer the result value with respect to the received input data using the learning model, generate a response and/or a control command based on the inferred result value, and transmit the generated data to the AI devices 1510*a* to 1510*e*. Alternatively, the AI devices 1510*a* to 1510*e* may directly infer a result value for the input data using a learning model, and generate a response and/or a control command based on the inferred result value.

Various embodiments of the AI devices 1510*a* to 1510*e* to which the technical features of the present invention can be applied will be described. The AI devices 1510*a* to 1510*e* shown in FIG. 15 can be seen as specific embodiments of the AI device 1400 shown in FIG. 14.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a wireless device in a wireless communication system, the method comprising:
   configuring multiple bandwidth parts (BWPs) including at least one active bandwidth part (BWP);
   receiving a received signal strength indicator (RSSI) measurement configuration and/or a channel occupancy measurement configuration from a network;
   performing, by a Radio Resource Control (RRC) layer of the wireless device, a RSSI measurement and/or a channel occupancy measurement per each of the multiple BWPs;
   checking, by the RRC layer, whether a first condition is met based on a result of the RSSI measurement and/or the channel occupancy measurement, wherein the first condition is that a BWP having a lowest channel busy rate has been changed;
   based on the first condition being met, providing, by the RRC layer, to a Medium Access Control (MAC) layer of the wireless device, a first report including (1) the result of the RSSI measurement and/or the channel occupancy measurement for each of the multiple BWPs, (2) information informing the MAC layer that the BWP having a lowest channel busy rate has been changed, and (3) an identity of the BWP having a lowest channel busy rate;
   determining, by the MAC layer of the wireless device, whether a second condition is met, after receiving the first report from the RRC layer, wherein the second condition is that (1) an inactive BWP has a lowest channel busy rate, and (2) the results of the RSSI measurement and/or the channel occupancy measurement of an active BWP is higher than a threshold;
   based on the second condition being met, transmitting, by the MAC layer to the network, a second report including (1) an identifier (ID) of the inactive BWP having a lowest channel busy rate, (2) the result of the RSSI measurement and/or the channel occupancy measurement and (3) information informing the network that the first condition and the second condition are met;
   receiving, from the network, an active BWP change command for the inactive BWP in response to the second report; and
   changing a current active BWP to an inactive BWP based on the active BWP change command.

2. The method of claim 1, wherein the first condition further includes that a BWP having a highest channel busy rate has been changed.

3. The method of claim 1, wherein the first condition further includes that a channel busy rate of a BWP among the multiple BWPs becomes lower than a first threshold.

4. The method of claim 1, wherein the first condition further includes that a channel busy rate of a BWP among the multiple BWPs becomes higher than a second threshold.

5. The method of claim 1, wherein the first condition further includes that all channel busy rates of the multiple BWPs become higher than a third threshold.

6. The method of claim 1, wherein the second condition further includes that the result of the RSSI measurement and/or the channel occupancy measurement of the inactive BWP is lower than the result of the RSSI measurement and/or the channel occupancy measurement of the at least one active BWP.

7. The method of claim 1, wherein the second condition further includes that the result of the RSSI measurement and/or the channel occupancy measurement of the inactive BWP is lower than a fifth threshold.

8. The method of claim 1, wherein the wireless device is an autonomous driving apparatus in communication with at least one of a mobile terminal, a network, and/or autonomous vehicles other than the wireless device.

9. A wireless device in a wireless communication system, the wireless device comprising:
   a memory;
   a transceiver; and
   a processor, operably coupled to the memory and the transceiver, and configured to:
   configure multiple BWPs including at least one active BWP;
   control the transceiver to receive a RSSI measurement configuration and/or a channel occupancy measurement configuration from a network;
   control a Radio Resource Control (RRC) layer of the wireless device to perform a RSSI measurement and/or a channel occupancy measurement per each of the multiple BWPs;
   control the RRC layer to check that a first condition is met based on a result of the RSSI measurement and/or the channel occupancy measurement, wherein the first condition is that a BWP having a lowest channel busy rate has been changed;
   based on the first condition being met, control the RRC layer to provide to a Medium Access Control (MAC) layer of the wireless device, a first report including (1) the result of the RSSI measurement and/or the channel occupancy measurement for each of the multiple BWPs, (2) information informing the MAC layer that the BWP having a lowest channel busy rate has been changed, and (3) an identity of the BWP having a lowest channel busy rate;
   control the RRC layer to determine, by the MAC layer of the wireless device, whether a second condition is met, after receiving the first report from the RRC layer, wherein the second condition is that (1) an inactive BWP has a lowest channel busy rate, and (2) the result of the RSSI measurement and/or the channel occupancy measurement of an active BWP is higher than a threshold;
   based on the second condition being met, control the MAC layer and the transceiver to transmit, to the network, a second report including (1) an identifier (ID) of the inactive BWP having a lowest channel busy rate, (2) the result of the RSSI measurement and/or the channel occupancy measurement and (3) information informing the network that the first condition and the second condition are met;

control the transceiver to receive, from the network, an active BWP change command for the inactive BWP in response to the report; and change a current active BWP from the at least one active BWP to an inactive BWP based on the active BWP change command.

* * * * *